United States Patent [19]
Hino et al.

[11] Patent Number: 5,703,947
[45] Date of Patent: Dec. 30, 1997

[54] PORTABLE TELEPHONE EQUIPMENT FOR BIASING A SWITCHING MEMBER TO A NORMALLY NEUTRAL POSITION

[75] Inventors: Ichiro Hino; Kazunori Imazaki, both of Kanagawa, Japan

[73] Assignee: Sony Corporation, Tokyo, Japan

[21] Appl. No.: 569,202

[22] PCT Filed: May 17, 1995

[86] PCT No.: PCT/JP95/00942
§ 371 Date: May 23, 1996
§ 102(e) Date: May 23, 1996

[87] PCT Pub. No.: WO95/31863
PCT Pub. Date: Nov. 23, 1995

[30] Foreign Application Priority Data

May 17, 1994 [JP] Japan .................. 6-127002

[51] Int. Cl.⁶ .................. H04M 1/00
[52] U.S. Cl. .................. 379/419; 379/433; 379/428; 455/575
[58] Field of Search .................. 379/419, 433, 379/428, 456, 447, 450, 434, 354, 396, 368, 367; 455/90, 575; D14/138; 381/109, 107

[56] References Cited

U.S. PATENT DOCUMENTS

| D. 350,744 | 9/1994 | Hino | D14/138 |
| D. 354,056 | 1/1995 | Claxton et al. | D14/138 |
| D. 368,711 | 4/1996 | Wicks et al. | D14/138 |
| 5,436,954 | 7/1995 | Nishiyama et al. | 379/433 |
| 5,461,672 | 10/1995 | Enokido et al. | 379/433 |
| 5,504,813 | 4/1996 | Takasaki | 379/433 |

FOREIGN PATENT DOCUMENTS

| 614092 | 1/1994 | Japan . |
| 6132868 | 5/1994 | Japan . |

Primary Examiner—William Cumming
Assistant Examiner—Keith Ferguson
Attorney, Agent, or Firm—Jay H. Maioli

[57] ABSTRACT

A communication terminal equipment includes a body formed in a substantially parallelepiped form, housing communicating and receiving means therein. In this communication terminal equipment, a linear portion forming a side surface of the body and a projecting outwardly portion projected from the side surface are formed to be contiguous to each other. A single operation member which can be caused to undergo a movement operation in a forward direction and in a reverse direction constituting an operation mechanism for carrying out input to and switching of the communicating and receiving means housed within the body is provided at the projected portion. Only the single operation member is subjected to movement operation in the forward and reverse directions and makes it possible to carry out input to the communicating and receiving means and switching thereof. In addition, the single operation member includes a rotational operation member rotatably provided with respect to the body and the operation mechanism for carrying out input to and switching of the communicating and receiving means includes a switch mechanism controlled by the rotational operation member. Thus, miniaturization of the operation mechanism is realized.

12 Claims, 9 Drawing Sheets

| ITEM | FUNCTION NO. | FUNCTION |
|---|---|---|
| GENERAL | F11 | AUTOMATIC DIAL LOCK |
| | F12 | LIGHTING ON/OFF |
| | F13 | TALKING TIME DISPLAY |
| | F14 | ACCUMULATED TALKING TIME DISPLAY |
| | F15 | TALKING TIME DISPLAY ON/OFF |
| | F16 | CHARGE DISPLAY ON/OFF |
| | F17 | AUTOMATIC CALL ORIGINATING/INCOMING ON/OFF |
| TONE | F21 | CALL INCOMING SOUND VOLUME ADJUSTMENT |
| | F22 | CALL INCOMING PATTERN SELECTION |
| | F23 | ADJUSTMENT OF KEY OPERATION SOUND VOLUME |
| | F24 | POWER ON SOUND ON/OFF |
| | F25 | AUTOMATIC SOUND VOLUME ADJUSTMENT ON/OFF |
| | F26 | CALL INCOMING SOUND LAMP UP ON/OFF |
| BATTERY | F31 | BATTERY LEVEL DISPLAY |
| | F32 | POWER SAVE FUNCTION |
| SETTING | F41 | SETTING FUNCTION RESET |
| | F42 | SHORTENED DIAL MEMORY ALL RESET |
| | F43 | LOCK CODE DISPLAY, CHANGE |
| | F44 | LOCAL TELEPHONE NO. SETTING |
| LIMIT | F51 | CALL ORIGINATING LIMITING |
| | F52 | CALL INCOMING LIMITING |
| | F53 | MEMORY CALL ORIGINATING LIMITING |
| CLOCK | F61 | DATE SETTING |
| | F62 | TIME SETTING |
| | F63 | ALARM SETTING ON/OFF |
| SPECIAL | F71 | MEMORANDUM |
| | F72 | CALL TIME ALARM |
| | F73 | TALKING DATA DISPLAY |
| | F74 | TALKING DATA ERASING |
| | F75 | MACH DIAL SETTING |
| OTHERS | F91 | CALLING NO. NOTICE INHIBIT |
| GUIDE | F0 | GUIDE FUNCTION |

PORTABLE TELEPHONE EQUIPMENT FOR BIASING A SWITCHING MEMBER TO A NORMALLY NEUTRAL POSITION

TECHNICAL FIELD

This invention relates to a communication terminal equipment and a portable (pocket) telephone equipment provided with communicating means or receiving means, and more particularly to a communication terminal equipment and a portable telephone equipment provided with operation means for carrying out input operation to the communicating means or the receiving means, or switching operation thereof.

BACKGROUND ART

Hitherto, in portable (pocket) telephone equipments provided with communicating means or receiving means, there have been known portable (pocket) telephone equipments provided with an operation button for carrying out adjustment (control) of received sound volume and/or an operation button for retrieving telephone numbers stored in a memory included within the equipment body. These operation buttons are constituted with pairs of operation buttons of "+" and "−" for each respective function. The operation button for carrying out adjustment of received sound volume is adapted so that gain of the voice amplifier is increased by operating the operation button of the "+" side and gain of the voice amplifier is decreased by operating the operation button of the "−" side. Moreover, the operation button for carrying out retrieval of telephone numbers is adapted so that retrieval of names is carried out in the up direction or in the down direction in alphabetical order by operating the operation button of the "+" side or the operation button of the "−" side.

Further, the operation button for carrying out adjustment of received sound volume is disposed at a side surface of the telephone equipment body. In addition, a pair of operation buttons which select various functions that the telephone equipment has, such as a pair of operation buttons constituting the operation buttons which select retrieval of telephone numbers use the "*" key and "#" key of a key pad dial keys. At a front surface side of the equipment body, there is provided a display section comprised of a liquid crystal display element for displaying the contents of various functions that the telephone equipment has as well as telephone numbers for example, stored in the memory.

Meanwhile, in the case of conventional portable telephone equipments as described above, since the frequently used pairs of operation buttons of the "+" side and the "−" side which carry out sound volume adjustment are disposed at a side surface of the equipment body in such a manner that they are close to each other, there is the problem that operation of a button on an erroneous side instead of on the desired side is apt to be carried-out. Particularly, since the portable telephone equipment is used in the state grasped or held by one hand and the operation button for adjustment of sound volume disposed at the side surface of the equipment body is frequently operated without being subjected to visual observation, there is the problem that an erroneous operation is apt to be carried out.

Further, since the pair of operation buttons which carry out retrieval of telephone numbers use the "* " key and the "#" key of dial keys, it is impossible to immediately recognize which key carries out retrieval in the up direction or in the down direction. Namely, the reason thereof is as follows. Since such operation buttons are caused to have a double function as a portion of the dial keys, individual functions are not indicated at respective keys. In addition, even if a plurality of functions are indicated at respective keys, it is difficult to immediately decide which function of the indicated functions is being operated at any given time.

DISCLOSURE OF THE INVENTION

An object of this invention is to provide a communication terminal equipment and a portable (pocket) telephone equipment which solves the problems with the above-described conventional equipments, thus making it possible to precisely carry out desired operations.

Another object of this invention is to provide a communication terminal equipment and a portable (pocket) telephone equipment in which the number of operation members for carrying out desired operations is reduced, thereby permitting the equipment to become more compact.

A further object of this invention is to provide a communication terminal equipment and a portable (pocket) telephone equipment in which improvement in operability when grasped or held by one hand is made.

A communication terminal equipment according to this invention constituted in order to attain the above-described objects includes a body formed so as to take substantially parallelepiped shape, and including communicating and/or receiving means therewithin. At a side surface of this body, a linear portion forming part of the side surface and a projected portion projecting outwardly from the side surface are formed contiguous to each other. Further, a single operation member which can be caused to undergo movement operation in the forward direction and in the reverse direction and which constitutes an operation mechanism adapted for carrying out input to the communicating and receiving means and carrying out switching thereof is included within the body and is provided at the projected portion. This communication terminal equipment is adapted so that when only the single operation member is subjected to movement operation in the forward/reverse direction, input to the communicating and/or receiving means and/or switching thereof can be carried out.

The-projected portion at which the operation member is disposed is formed in a manner projected outwardly in a circular arc form from the side surface of the body.

Moreover, the single operation member is comprised of a rotational operation member rotatably provided with respect to the body, and the operation mechanism which carries out input to the communicating and/or receiving means and/or switching thereof further comprises a switch mechanism subjected to switching control by the rotational operation member. As stated above, in the operation mechanism, the operation member is constituted by the rotational operation member and the switch mechanism is provided in association therewith. Thus, miniaturization of the mechanism is realized.

Further, the rotational operation member rotatably provided with respect to the body is positioned in the vicinity of the boundary portion contiguous with the linear portion at a distal point relative to the side surface of the body, thereby making it possible to position it without having to project it from an outer circumferential surface thereof.

Furthermore, the operation mechanism for carrying out input to the communicating and/or receiving means and/or switching thereof is of a structure which further comprises a switching member rotatably attached with respect to the body and rotationally driven by rotational operation of the rotational operation member to switch the switching member, and a biasing member for biasing the switching member in a direction to return to a neutral position, whereby when the switching member is returned to the neutral position by the biasing member, the rotational operation member is returned to the neutral position. In addition, the rotational operation member is always maintained at the neutral position when in an inoperative state. Thus, rapid and reliable input to the communicating and/or receiving means and/or switching thereof is realized.

Moreover, the operation mechanism which carries out input to the communicating and/or receiving means and/or switching thereof may be constituted by a single movement operation member provided so that it can be moved in the forward direction and in the reverse direction along the side surface of the body with respect to the body, and a switch mechanism operated by the movement operation member.

Further, a portable telephone equipment according to this invention comprises a communicating and receiving section, a display section on which information based on a transmitting or receiving operation by the communicating and receiving section is displayed, a plurality of input keys for carrying out input operation with respect to the communicating and/or receiving section, a body formed in substantially parallelepiped form, including communicating and receiving means housed therein, wherein the display section and the plurality of keys are disposed on one surface and a projected portion projected outwardly from the side surface is formed on the side surface, and an operation mechanism provided at the projected portion and adapted for carrying out input to the communicating and/or receiving section and/or switching thereof provided with a single operation member which can be caused to undergo movement operation in the forward direction and in the reverse direction. Further, this portable telephone equipment is adapted so that input to the communicating and/or receiving section and/or switching thereof is carried out by operation of the single operation member which can be caused to undergo movement operation in the forward direction and in the reverse direction.

In addition, the operation mechanism for carrying out input to the communicating and/or receiving means and/or switching thereof of the portable telephone equipment further comprises a switching member rotatably attached to the equipment body and rotationally driven by rotational operation of the rotational operation member to switch the switching member, and a biasing means for biasing the switching member in a direction to return it to the neutral position, whereby when the switching member is returned to the neutral position by the biasing member, the rotational operation member is returned to the neutral position.

BEST MODE FOR CARRYING OUT THE INVENTION

An embodiment of the present invention will now be described for a portable (pocket) telephone equipment in which a (telephone) transmitter and a (telephone) receiver are included within a cabinet 1 constituting the equipment body.

Figure 1:
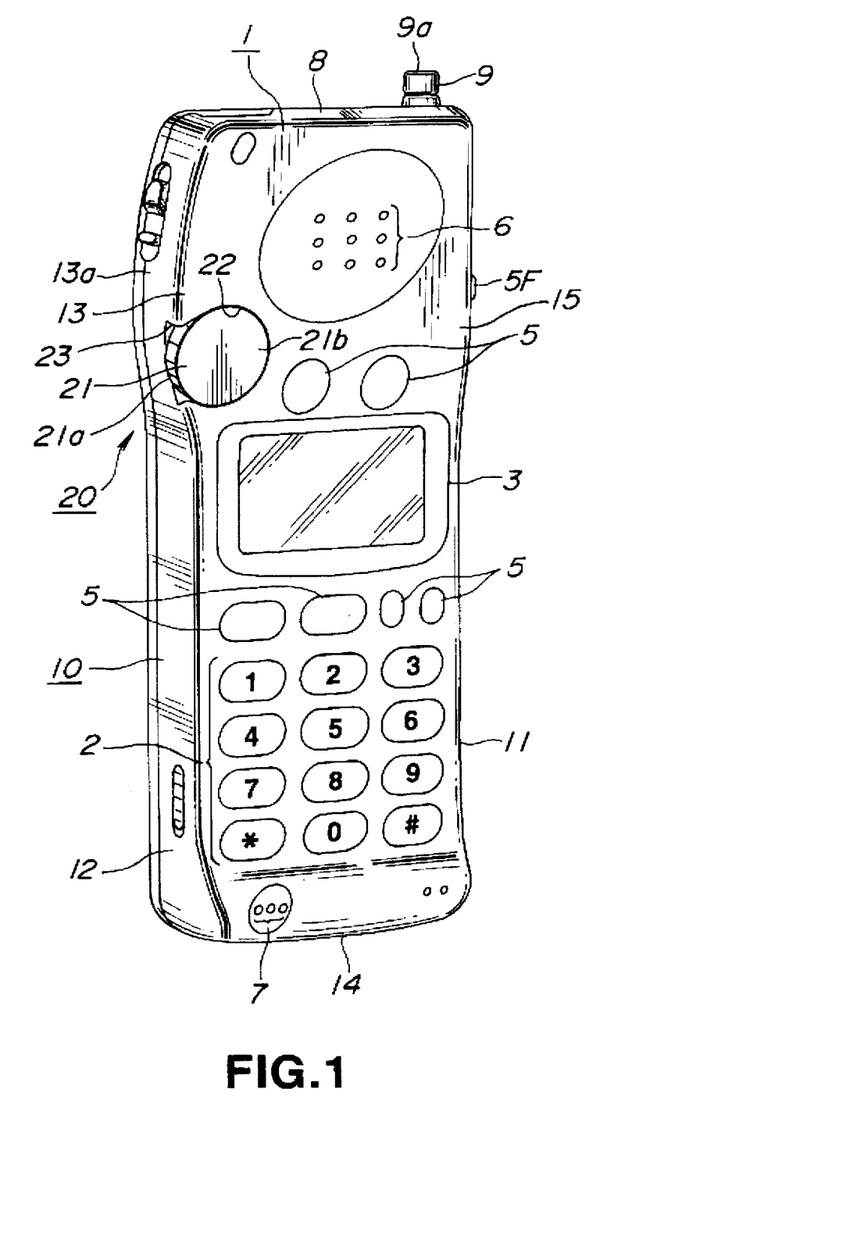
FIG. 1 is a perspective view showing a portable telephone equipment according to this invention.
Figure 2:
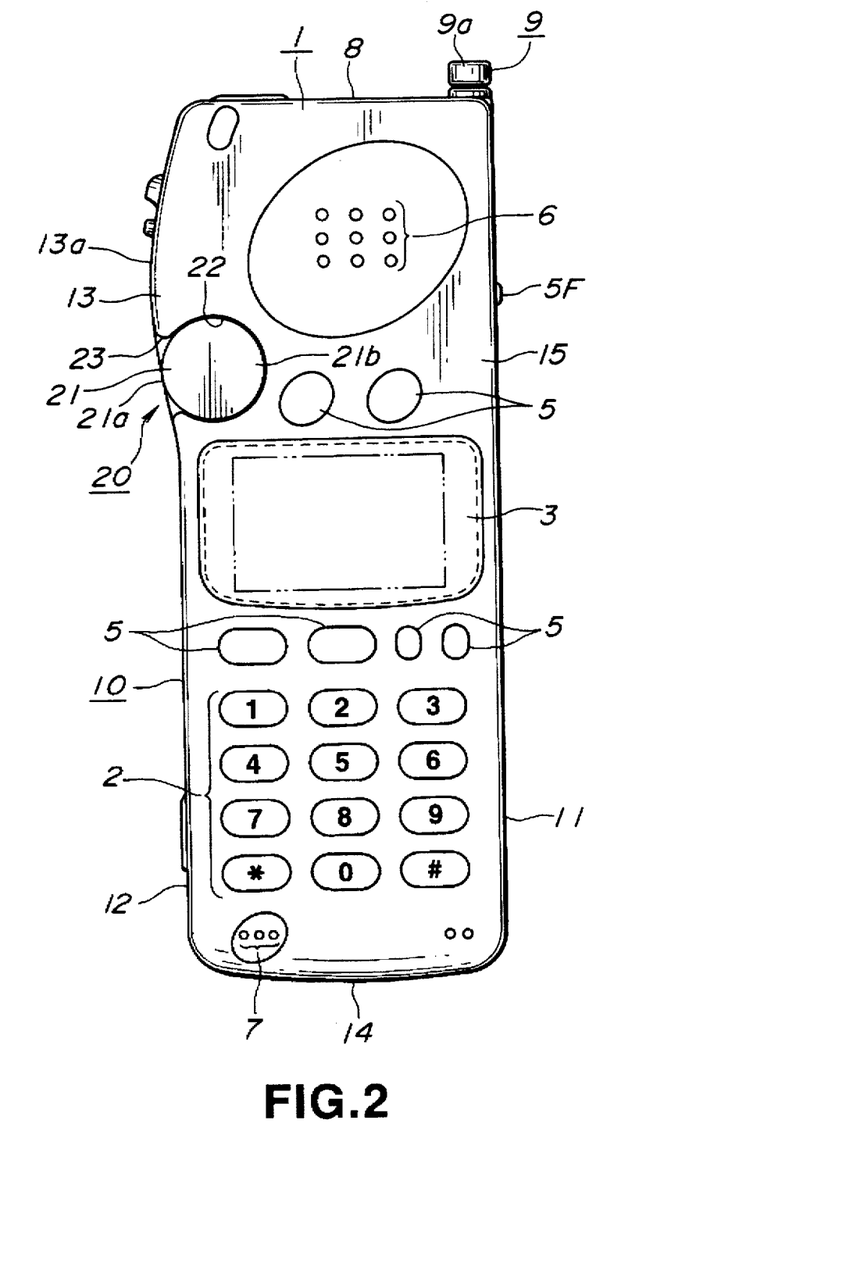
FIG. 2 is a front view of the portable telephone equipment shown in FIG. 1.

The portable telephone equipment of this embodiment includes, as shown in FIGS. 1 and 2, cabinet 1 constituting the equipment body including therein a telephone circuit, a transmitter and a receiver. The cabinet 1 has a substantially parallelepiped shape, and is formed so as to have dimensions which can be grasped or held by one hand. At a front surface 15 of the cabinet 1, a dial key (assembly) 2 comprised of a plurality of keys, and a display section 3 comprised of a liquid crystal display element for displaying telephone numbers or information relating to a function state, for example, stored in a memory of the telephone equipment. As shown in FIGS. 1 and 2, the display section 3 is disposed at a central portion along a length direction of the cabinet 1, and the dial key 2 is disposed at a portion of the cabinet 1 on a lower side of the display section 3. In addition, various function control keys 5 are disposed between the display section 3 and the dial key 2 and also at a portion of the cabinet 1 on an upper side of the display section 3.

Further, at the front surface 15 of the cabinet 1, sound producing holes 6 comprised of a plurality of very small holes located opposite to a vibrating plate of the receiver and sound collecting holes 7 comprised of a plurality of very small holes located opposite to a vibrating plate of the transmitter included within the cabinet 1 are provided. As shown in FIG. 1, the sound producing holes 6 are positioned toward an upper end side of the front surface 15 of the cabinet 1, and the sound collecting holes 7 are positioned toward a lower end side of the front surface 15 of the cabinet 1. The sound producing holes 6 and the sound collecting holes 7 are disposed at a distance substantially corresponding to the spacing between the ear and a mouth of the human being. Namely, the distance between the sound producing holes 6 and the sound collecting holes 7 is set so that when the cabinet 1 is grasped or held by one hand to allow the sound producing holes 6 to be in contact with the ear to use the telephone equipment, the sound collecting holes 7 are faced to the vicinity of the mouth so that collection of sound (talking) can be made.

Moreover, a head portion 9a of an extensible transmitting/receiving antenna 9 is faced on an upper end surface 8 of the cabinet 1. This antenna 9 is accommodated within the cabinet 1. By grasping or holding the head portion 9a faced to the upper end surface 8 to draw it out from the cabinet 1, the antenna 9 is extended.

At a side surface 10 side perpendicular to the front surface 15 where the dial key 2 and the display section 3 are disposed on the cabinet 1, a linear portion 12 parallel to the other side surface 11 opposite to the side surface 10, and a projected portion 13 projecting outwardly from the side surface 10 in a manner gradually continuous with the linear portion 12 are formed. The linear portion 12 formed at the side surface 10 extends from a lower end surface 14 side of the cabinet 1 toward an intermediate portion along the length direction of the cabinet 1 adjacent a side surface of the display section 3. Moreover, the projected portion 13 is provided at the intermediate portion along the length direction of the cabinet 1 to the upper end surface 8 thereof. More particularly, the projected portion 13 is formed in such a manner that it is gradually curved so as to have a side surface 13a having a circular arc form projecting outwardly from the side surface 10.

In this example, at the other side surface 11 side of the cabinet 1, a function select key 5F is disposed for switching a display form of the display section 3, such as, for example, switching the kind of the character and/or display content displayed on the display section 3 is disposed.

Since the telephone equipment of this embodiment is of a structure in which the projected portion 13 is formed at the upper end of the side surface 10 side of the cabinet 1, in the case where it is grasped or held by one hand with the side where the dial key 2 is disposed being directed in a downward direction, the projected portion 13 is caused to rest on the hand which has grasped the cabinet 1 (telephone equipment), thereby making it possible to securely prevent it from slipping or dropping during use.

Figure 6:
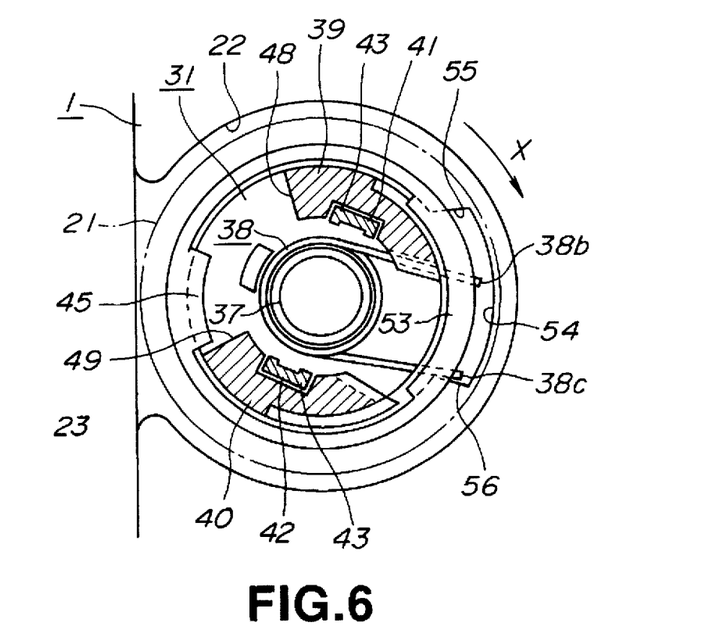
FIG. 6 is a lateral cross sectional view of the operation mechanism showing a state where the operation knob of FIG. 5 is rotationally operated in a forward direction.
Figure 7:
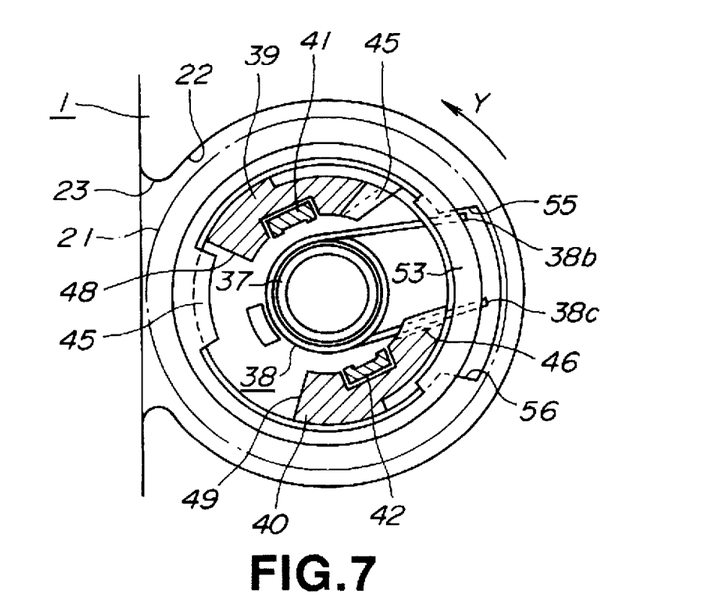
FIG. 7 is a lateral cross sectional view of the operation mechanism showing a state where the operation knob of FIG. 5 is rotationally operated in a the reverse direction.

Further, the telephone equipment of this embodiment includes an operation mechanism 20 for carrying out input to the transmitting section and the receiving section included within the equipment and/or switching control of functions that the transmitting section and the receiving section have. This operation mechanism 20 is provided with an operation knob (button) 21 formed circular which is a single rotational operation member rotationally operated in the forward direction and in the reverse direction as shown in FIGS. 6 and 7 which will be described later. As shown in FIGS. 1 and 2, the operation knob 21 is disposed so that it is sunken within a fitting recessed portion 22 which has a substantially circular recess formed at the front surface 15 side of the cabinet 1.

Meanwhile, the fitting recessed portion 22 within which the operation knob 21 is disposed is positioned at an area of the projected portion 13 formed at the side surface 10 side of the cabinet 1. At the portion facing to the boundary portion contiguous with the linear portion 12 from the maximum projected portion from the side surface 10 of the projected portion 13 of the fitting recessed potion 22, a cut portion 23 opened to the side surface 10 is formed. As shown in FIGS. 1 and 2, the circular operation knob 21 is disposed within the fitting recessed portion 22 in the state where a portion of an outer circumferential surface 21a is faced to the side surface 10 of the cabinet 1 through cut portion 23. In this case, a portion of the outer circumferential surface 21a of the operation knob 21 is faced to the side surface 10 through the cut portion 23 in the state substantially flush (level) with the side surface 10. The operation knob 21 disposed at the front surface 15 of the cabinet where a portion of the outer circumferential surface 21a is faced to one side surface 10 in a manner as described above is adapted so that when a user grasps or holds the cabinet 1 by the left hand, it can be rotated in the forward direction or in the reverse direction by the thumb manipulating a portion of the outer circumferential surface 21a faced to the side surface 10 being as the operation portion. Moreover, since the operation knob 21 is disposed within the fitting recessed portion 22 such that a portion of the outer circumferential surface 21a is faced to the boundary portion contiguous with a distal position from the side surface 10 of the projected portion 13 to the linear portion 12, it is at a concaved portion of the outer circumferential surface of the cabinet 1. As a result, even in the case where accident or failure such as by dropping, for example, occurs during use, it is prevented from receiving a direct impact. Thus, reliable protection can be made.

Figure 3:
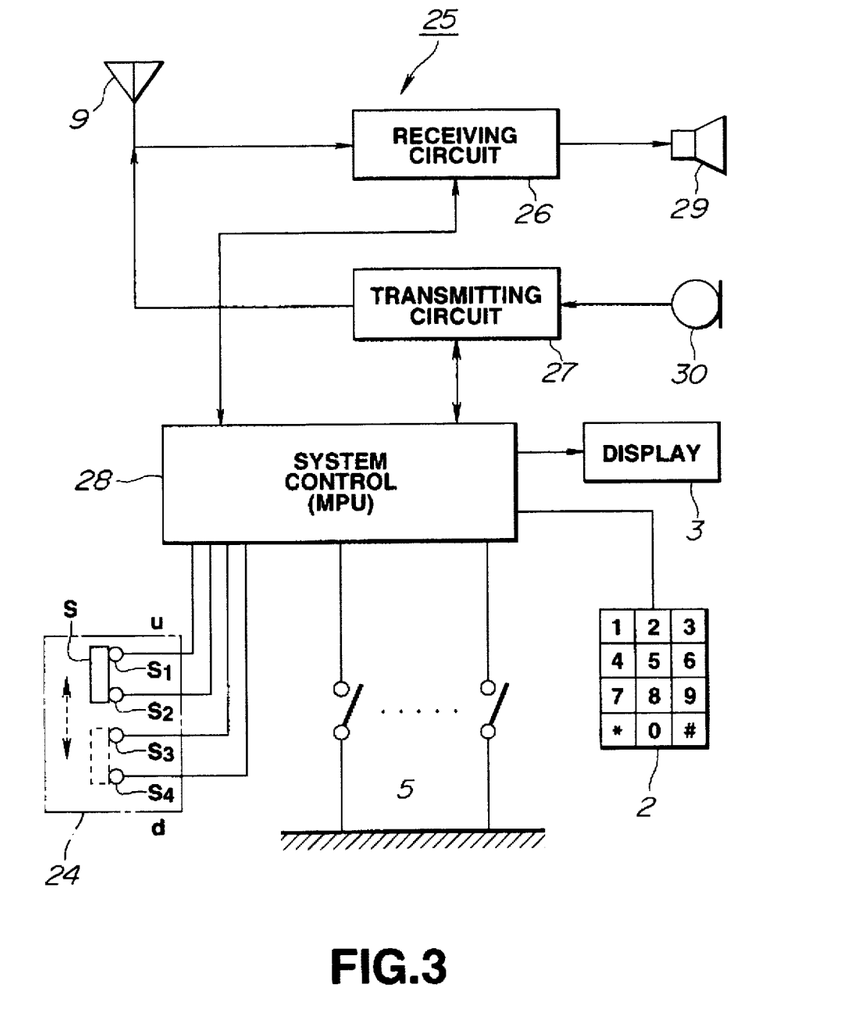
FIG. 3 is a circuit diagram showing a circuit configuration of the portable telephone equipment according to this invention.

Moreover, a telephone circuit 25 constituted as shown in FIG. 3 is accommodated within the cabinet 1. This telephone circuit 25 is composed of a receiving circuit 26 constituting the receiving section, a transmitting circuit 27 constituting the transmitting section, and a system control circuit 28 constituted by a microcomputer. Further, a receive (receiving) signal received by the antenna 9 is delivered to the receiving circuit 26. Thus, this receive signal is demodulated into a speech signal by the receiving circuit 26. The speech signal thus obtained is delivered to a receiver 29, and produces voice (sound) from the receiver 29. Moreover, a voice incoming to the transmitter 30 is converted into a speech signal by the transmitter 30. The speech signal thus obtained is delivered to the transmitting circuit 27. This speech signal is converted into a transmit (transmitting) signal by the transmitting circuit 27. The transmit signal thus obtained is delivered to the antenna 9. Thus, this transmit signal is transmitted through the antenna 9.

Further, the dial key 2 and the function control key 5 are connected to the system control circuit 28, and the display section 3 is connected thereto. The operations of the receiving circuit 26 and the transmitting circuit 27 are controlled in accordance with operations of these keys 2, 5. Thus, various displays corresponding to the control states are displayed on the display section 3.

Moreover, in the telephone equipment of this embodiment, a select (changeover) switch 24 subjected to switching operation by operation of the operation mechanism 20 is connected to the system control circuit 28. This select switch 24 has three switching (select) positions, wherein the switching position positioned in the center is caused to be the neutral position. In the state where slide element S of the select switch 24 connect two contacts $s_1$ and $s_2$ of the u side which is the position indicated by solid line in FIG. 3, a control in the up direction to increase sound volume is carried out stepwise with respect to a function such as sound volume adjustment. In the state where the slide element S connects two contacts $s_3$ and $s_4$ of the d side which is the position indicated by broken lines in FIG. 3, a control in the down direction to decrease sound volume is carried out stepwise.

It is to be noted that in the state where the slide element S is placed at the neutral position to connect the intermediate two contacts $s_2$ and $s_3$ in FIG. 3, no control is carried out.

A more practical configuration of the operation mechanism 20 used in the telephone equipment of this embodiment will now be described with reference to FIGS. 4 and 5. This operation mechanism 20 is provided with the previously described operation knob 21, a switching member 31 adapted so that the operation knob 21 is integrally connected and it is rotationally operated by the operation knob 21, and a Supporting base (substrate) 32 formed by punch-bending a thin metallic plate on which the switching member 31 is rotatably supported.

The switching member 31 rotationally operated by the operation knob 21 is formed to be substantially disc-shared by molding synthetic resin, which is insulating material, and is rotatably supported on the supporting base 32 by inserting a support shaft 34 vertically provided on the supporting base 32 into or through a shaft insertion hole 33 bored at the central portion. At the support shaft 34 which supports the switching member 31, a head portion 34b for prevention of slip-off is formed at one end side of a shaft portion 34a, and a caulking piece 34c is formed at the other end side of the shaft portion 34a. This support shaft 34 is vertically provided on the supporting base 32 by inserting the shaft portion 34a into or through the shaft insertion hole 33 of the switching member 31 to insert the caulking piece 34c into or through a penetration hole 35 bored at the supporting base 32 to caulk it. With respect to the switching member 31 supported by the support shaft 34 by inserting the shaft portion 34a into or through the shaft insertion hole 33 as stated above, prevention of slip-off is carried out by the head portion 34b of the support shaft 34. Thus, the switching member 31 is rotatably attached on the supporting base 32 with the support shaft 34 being as the center.

In this example, a circular recessed portion 36 having a diameter substantially equal to the outside diameter of the switching member 31 is formed, with the penetration hole 35 through which the support shaft 34 is vertically provided being as the center, at the supporting base 32. This recessed portion 36 serves to dispose a contact piece in which contacts constituting a select switch 24 which will be described later are formed without projecting it from the supporting base 32 consisting of thin metal plate. Further, this recessed portion 36 serves to limit fluctuation of the switching member 31 supported on the support shaft 34, thus providing stable rotation with the support shaft 34 of the switching member 31 being as the center. In addition, this supporting base 32 is fixed by screw, for example, into the cabinet 1.

At the central portion of the upper surface side of the switching member 31, a spring supporting portion 37 which takes cylindrical shape is provided, in a manner to surround the shaft insertion hole 33, in a projected fashion (hereinafter simply referred to as projected depending upon circumstances). At the spring supporting portion 37, a torsional coil spring 38 for returning the switching member 31 rotationally operated in the forward direction or in the reverse direction as described later is attached. This torsional coil spring 38 is disposed at the upper surface side of the switching member 31 with a coil portion 38a of the central portion being fitted over the spring supporting portion 37. In addition, at the upper surface side of the switching member 31, a spring limiting piece 37a for limiting elastic (resilient) deformation of the coil portion 38a of the torsional coil spring 38 supported by the spring supporting portion 37 is projected in a manner opposite to the spring supporting portion 37.

Further, at the upper surface side of the switching member 31, knob connecting pieces 39, 40 which have a circular arc shape for connecting the operation knob 21 are projected at the positions opposite to each other with the spring supporting portion 37 being as the center. At the surfaces opposite to each other of these knob connecting pieces 39, 40, engagement grooves 43, 44 with which a pair of engagement projections 41, 42 projected at the internal surface side of the operation knob 21 are relatively engaged are formed. Further, the operation knob 21 is connected to the switching member 31 through the knob connecting pieces 39, 40 by allowing the engagement projections 41, 42 to be relatively engaged with the engagement grooves 43, 44. In addition, holding pawls and holding grooves are provided between engagement projections 41, 42 and engagement grooves 43, 44 which are relatively engaged with each other to allow these holding pawls and these holding grooves to be relatively engaged with each other, thereby making it possible to connect the operation knob 21 to the switching member 31 in the state where reliable prevention of slip off has been established.

Moreover, at a pair of opposing surfaces of the pair of knob connecting pieces 39, 40, there are formed spring holding portions 45, 46 in which intermediate portions of a pair of arm portions 38b, 38c of the torsional coil spring 38 supported by the spring supporting portion 37 are respectively held. The torsional coil spring 38 is supported by the spring supporting portion 37 in a manner such that a pair of arm portions 38b, 38c are respectively held by spring holding portions 45, 46 in the state where they are elastically deformed in a direction to close them. Accordingly, the torsional coil spring 38 is disposed on the switching member 31 in the state where elastic force is applied thereto.

Further, another pair of opposing surfaces of the pair of knob connecting pieces 39, 40 is in contact with a rotation limiting piece 47 formed at the cabinet 1 side, and are thus caused to serve as contact portions 48, 49 for limiting the rotational range of the switching member 31 and the operation knob 21 connected to the switching member 31.

On the other hand, at the bottom surface of the fitting recessed portion 22 in which the operation knob 21 connected to the switching member 31 is disposed in such a manner that it is embedded, an opening portion 50 for facing the switching member 31 to the front surface 15 side of the cabinet 1 is bored. Moreover, a rising cylindrical wall 51 having a height lower than the depth of the fitting recessed portion 22 is formed in a manner to surround the opening portion 50 within the fitting recessed portion 22. The area forming a groove encompassed by the rising wall 51 and the inner circumferential surface of the fitting recessed portion 22 is caused to serve as a groove portion 53 into which a cylindrical flange portion 52 constituting outer circumferential surface 21a of the operation knob 21 formed in a manner to hang down at the outer circumferential edge of the operation knob 21 is admitted.

Further, at the upper end side of the rising wall 51, the rotation limiting piece 47 is projected toward the opening portion 50 side. This rotation limiting piece 47 is projected into the portion between a pair of knob connecting pieces 39, 40 provided at the switching member 31, whereby when the switching member 31 is rotationally operated, it selectively comes into contact with contact portions 48, 49 to limit the rotational range of the switching member 31. Further, at the upper end side of the rising wall 51, a spring supporting piece 53' which supports arm portions 38b, 38c of the torsional coil spring 38 supported by the switching member 31 and prevents slip-off from the switching member 31 of the torsional coil spring 38 is projected toward the opening portion 50 side.

Furthermore, at a portion of the bottom surface side of the rising wall 51, a cut portion 54 to which front end sides of arm portions 38b, 38c of the torsional coil spring 38 supported by the switching member 31 are faced is formed. The surfaces of the both sides of the cut portion 54 are caused to serve as spring contact surfaces 55, 56. The switching member 31 is disposed at the cabinet 1 in the state where arm portions 38b, 38c of the torsional coil spring 38 are caused to be respectively in contact with spring contact surfaces 55, 56, whereby it is caused to undergo biasing force of the torsional coil spring 38 so that it is held at the fixed neutral position at all times. At this time, the operation knob 21 connected to the switching member 31 is also held at the neutral position.

Meanwhile, at the operation mechanism 20, select (changeover) switch 24 shown in the circuit diagram of FIG. 3 is provided. This select switch 24 is provided between the switching member 31 rotationally operated and the supporting base 32 on which the switching member 31 is rotatably supported.

The select switch 24 is constituted by a slide element 61 formed by punching metallic plate such as phosphor bronze, etc. having conductive property disposed at the lower surface side opposite to the supporting base 32 of the switching member 31, and four contacts 63a~63d formed at a portion of a flexible wiring board 62 extended to the supporting base 32 side.

Figure 4:
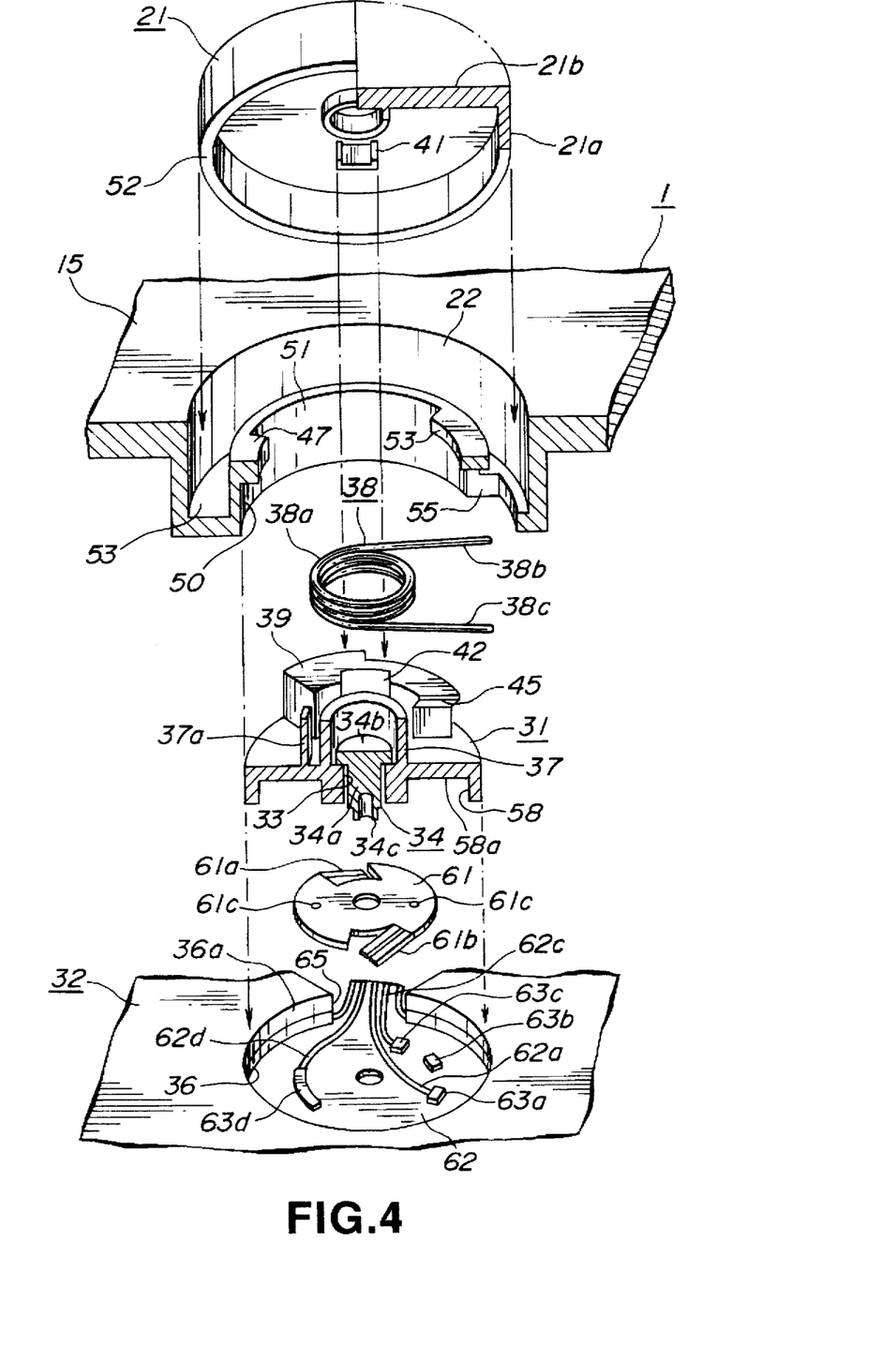
FIG. 4 is an exploded perspective view showing an operation mechanism of the portable telephone equipment according to this invention.

As shown in FIG. 4, the contact element 61 constituting the select switch 24 is formed ring-shared in such a manner that first and second contacts 61a, 61b are formed at the peripheral edge, and is disposed in such a manner that it is fitted into a fitting recessed portion 58 formed at the lower surface side opposite to the supporting base 32 of the switching member 31. This slide element 61 is subjected to positioning within the fitting recessed portion 58 by allowing projections 58a, 58a projected on the bottom surface of the fitting recessed portion 58 into through-holes 61c, 61c bored at the principal surface. Thus, it is attached thereto.

The four contacts 63a~63d constituting the select switch 24 such that first and second contacts 61a, 61b of the contact element 61 are selectively in contact therewith are formed at portions where contacts are to be formed extended from the flexible wiring board 62, and joined and disposed within the recessed portion 36 formed on the supporting base 32.

In this example, terminal portions (lead-out portions) of the flexible wiring board 62 in which the portions where contacts are to be formed are caused to be joined within the recessed portion 36 are drawn to the outside through a cut portion 65 formed by cutting a portion of the rising circumferential wall 36a constituting the recessed portion 36.

First, second and fourth contacts 63a, 63c and 63d of four contacts 63a~63d formed at the portions where contacts are to be formed are respectively connected to conductive patterns 62a, 62c and 62d formed at the flexible wiring board 62, and are caused to be conductive with the system control circuit 28. On the contrary, the second contact 63b is caused to be independent without being connected to the conductive pattern. In addition, the fourth contact 63d is formed so as to have length extending over the rotational range of the switching member 31 in such a manner that the first contact 61a of the slide element 61 is always in contact therewith.

Further, when the switching member 31 is rotated in the state where the first contact 61a of the slide element 61 is in contact with the fourth contact 63d, and the second contact 61b comes into contact with the first contact 63a so that the slide element 61 short-circuits the portion between the fourth and first contacts 63d and 63a, for example, in the case where function like sound volume adjustment is selected, a control in the up direction to increase sound volume is carried out stepwise as previously described. On the other hand, when the second contact 61b comes into contact with the third contact 63c so that the slide element 61 short-circuits the portion between the fourth and second contacts 63d and 63c, a control in the down direction to decrease sound volume is carried out stepwise.

It is to be noted that when the second contact 61b is in contact with the second contact 63b which is not connected to the conductive pattern, and the slide element 61 is in opened state, the switching member 31 is placed at the neutral position, i.e., is placed in the state where any control is not carried out.

In order to assemble the operation mechanism 20 constituted as described above into the cabinet 1, the switching member 31 is faced to the opening portion 50 formed at the bottom surface of the fitting recessed portion 22 to allow the supporting base 32 which has supported the switching member 31 to come into contact with the bottom surface of the fitting recessed portion 22 to fix it by using set screw, etc. at the cabinet 1. At this time, a pair of arm portions 38b, 38c of the torsional coil spring supported at the switching member 31 are caused to be elastically deformed substantially in a direction to close those arms so that they are faced to the cut portion 54 formed at the cabinet 1 side to allow them to come into contact with spring contact surfaces 55, 56 constituted at the both sides of the cut portion 54. A pair of arm portions 38b, 38c of the torsional coil spring 38 are caused to come into contact with spring contact surfaces 55, 56 of the cabinet 1 side in a manner as stated above, whereby the switching member 31 is caused to undergo biasing force of the torsional coil spring 38 as shown in FIG. 5 so that it is held at the neutral position which is a fixed rotational position. At this time, setting is made such that the second contact 61b of the slide element 61 constituting the select switch mechanism 24 comes into contact with the second contact 63b which is not connected to the conductive pattern so that the slide element 61 is caused to be in opened state and is caused to be in neutral state also from an electrical point of view.

Then, the operation knob 21 is inserted into the fitting recessed portion 22 to allow a pair of engagement projections 41, 42 to be relatively engaged with engagement grooves 43, 44 of the switching member 31, whereby connection to the switching member 31 of the operation knob 21 is carried out. Thus, assembling of the operation mechanism 20 is completed. At this time, the operation knob 21 is disposed within the fitting recessed portion 22 in a manner to insert the flange portion 52 of the outer circumferential side into the groove portion 53 to allow the upper surface 21b to be substantially flush with the front surface 15 of the cabinet 1.

The state where the operation mechanism 20 assembled at the cabinet 1 as described above is operated to carry out switching operation of the select switch 24 will now be described.

Figure 5:
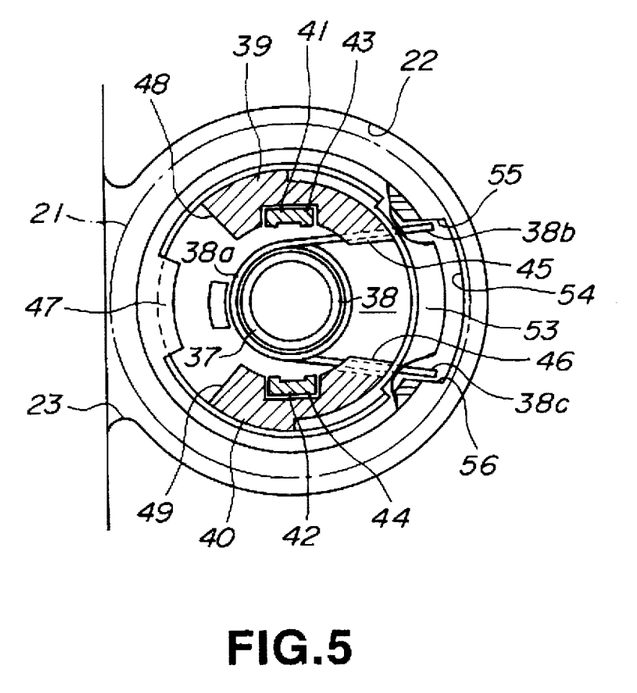
FIG. 5 is a lateral cross sectional view showing the operation mechanism of FIG. 4.

In this operation mechanism 20, in the state where the operation knob 21 is not operated, a pair of arm portions 38b, 38c of the torsional coil spring 38 are caused to be in contact with spring contact surfaces 55, 56 of the cabinet 1 side in the state where those pair of arm portions 38a, 38c of the torsional coil spring 38 are biased in a direction to close the arm portions, whereby the switching member 31 is caused to be held at a neutral position as shown in FIG. 5. When the operation knob 21 is rotated in the forward direction of the clockwise direction which is the X-direction indicated by the arrow in FIG. 6 from the state shown in FIG. 5, the contact portion 48 constituted at the other surface of the other knob connecting piece 40 of the switching member 31 is rotated until the rotational position where it comes into the rotation limit piece 45 provided within the fitting recessed portion 22 formed at the cabinet 1 and is stopped thereat. When the switching member 31 is rotated up to the rotational position shown in FIG. 6, the slide element 61 provided at the switching member 31 short-circuits the portion between the fourth and first contacts 63d and 63a through first and second contacts 61a, 61b. Thus, in the case where a function such as sound volume adjustment is selected, a control in the up-direction to increase sound volume is continuously carried out.

Meanwhile, when the operation knob 21 is rotated in the forward direction which is the X-direction indicated by the arrow in FIG. 6, one arm portion 38b of the torsional coil spring 38 supported by the switching member 31 is held at one spring holding portion 45 provided at the switching member 31, and is caused to undergo elastic (resilient) displacement in the X-direction indicated by the arrow in FIG. 6 along with the switching member 31. As a result, one arm portion 38b comes into contact with the spring contact surface 56 provided at the cabinet 1 side, and is caused to undergo elastic displacement to the other arm portion 38c side of which position is fixed. Thus, the torsional coil spring 38 is caused to undergo elastic displacement in a direction where a pair of arm portions 38b, 38c are closed. At this stage, when holding of the operation knob 21 is released, the switching member 31 is caused to undergo elastic restoring force of the torsional coil spring 38 so that it is rotated in the direction opposite to the X-direction indicated by the arrow. Thus, the switching member 31 is returned to the neutral position shown in FIG. 5. At this time, the operation knob 21 connected to the switching member 31 is also returned to the neutral position.

Moreover, when the operation knob 21 is rotated in the opposite direction of the counterclockwise direction which is the Y-direction indicated by the arrow in FIG. 7 from the state where the switching member 31 is placed at the neutral position shown in FIG. 5, the contact portion 49 constituted at the other surface of one knob connecting piece 39 of the switching member 31 is rotated until the rotational position in contact with the rotational limiting piece 47, and is stopped thereat. When the switching member 31 is rotated to the rotational position shown in FIG. 7, the slide element 61 provided at the switching member 31 short-circuits the portion between fourth and third contacts 63d and 63c through first and second contacts 61a, 61b. In the case where a function like sound volume adjustment is selected, a control in the down direction to decrease sound volume is continuously carried out.

Also in this case, when the operation knob 21 is rotated in the direction opposite to the Y-direction indicated by the arrow in FIG. 6, the other arm portion 38c of the torsional coil spring 38 supported by the switching member 31 is held by the other spring holding portion 48 provided at the switching member 31. Thus, the other arm portion 38c is caused to undergo elastic displacement in the Y-direction indicated by the arrow in FIG. 7 along with the switching member 31, and is caused to come into contact with the spring contact surface 57 provided at the cabinet 1 side. As a result, the other arm portion 38c is caused to undergo elastic displacement to one arm portion 38b side of which position is fixed. Thus, the torsional coil spring 38 is caused to undergo elastic displacement in a direction where a pair of arm portions 38b, 38c are closed. When holding of the operation knob 21 is released, the switching member 31 is caused to undergo elastic restoring force of the torsional coil spring 38 along with the operation knob 21, and is rotated in the direction opposite to the Y-direction indicated by the arrow. Thus, the switching member 31 is returned to the neutral position shown in FIG. 5.

When the switching member 31 is returned to the neutral position shown in FIG. 5, the second contact 61b of the slide element 81 comes into contact with the second contact 63b which is not connected to the conductive pattern, resulting in the state where the slide element 61 is opened. Thus, control is stopped.

Accordingly, the operation mechanism 20 of this embodiment can carry out control operation identical to the conventional pair of operation buttons of "+" and "−" by the single operation knob 21.

Moreover, in the case where the telephone equipment of this embodiment is set to the talking (speaking) mode, when the operation knob 21 is rotationally operated in the forward direction which is the X-direction indicated by arrow shown in FIG. 6, or in the reverse direction which is the Y direction indicated by the arrow shown in FIG. 7, the received sound volume is adjusted at six stages in the up direction or in the down direction.

Figure 8:
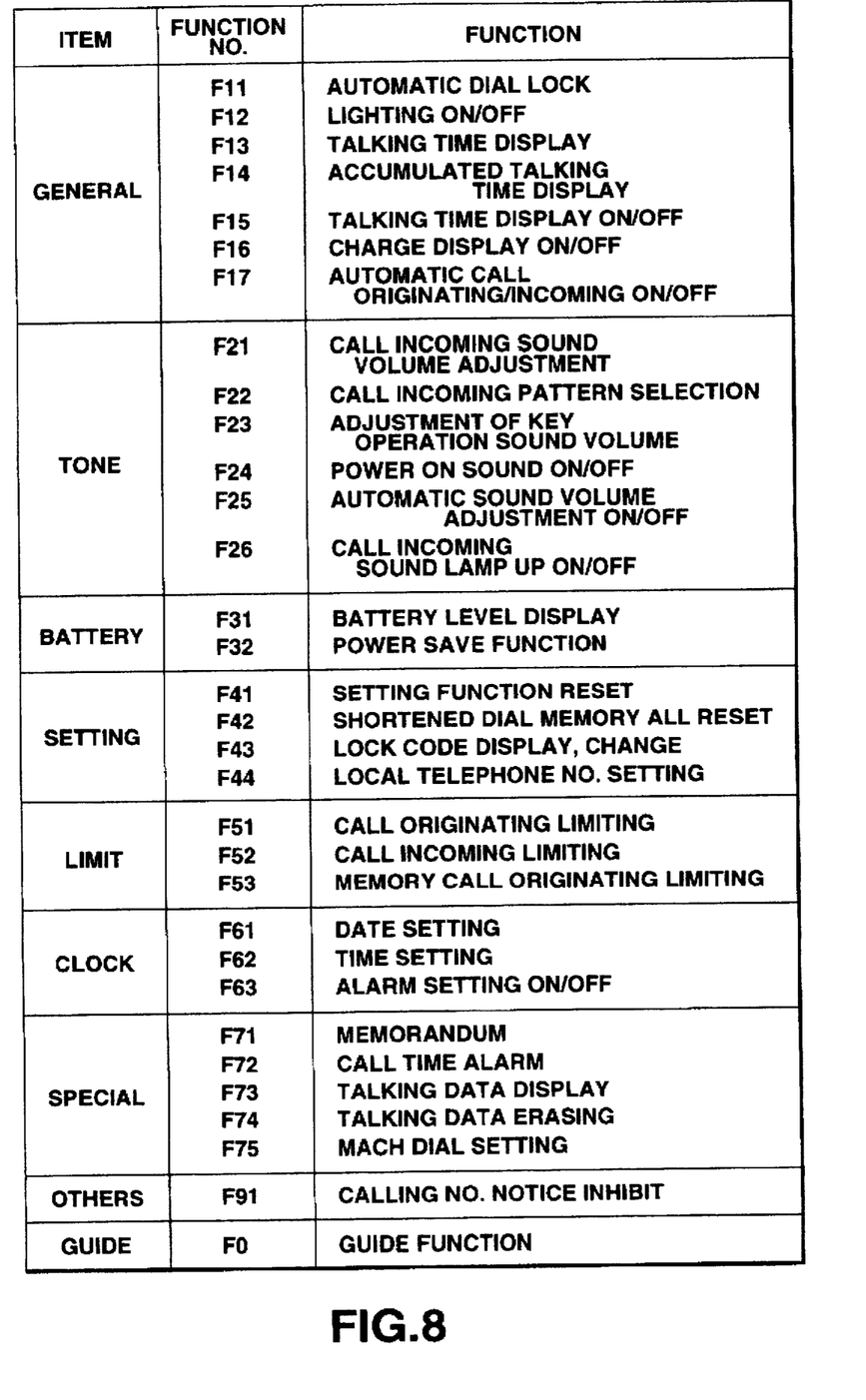
FIG. 8 is an explanatory chart for explaining the operation of the portable telephone equipment according to this invention.
Figure 9A:
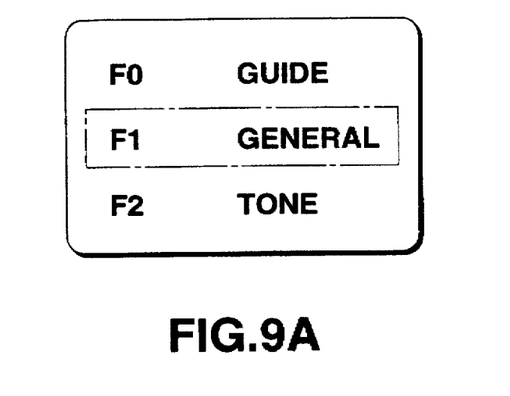
FIG.9A is a front view showing an example of a display state of a display section.

Further, the operation knob 21 is rotationally operated to select in succession functions shown in FIG. 8, for example, thus making it possible to carry out its setting. Namely, when the function key 5F provided at the other side surface 11 of the cabinet 1 of function control keys 5 is operated, the function select mode is selected. On the display section 3, as shown in FIG. 9A, functions of three lines of the item of classification of the functions shown in FIG. 8 are displayed, and only the function of one line at the central portion is displayed in the state where it is emphasized by flushing. In FIG. 9A, flushing display is indicated in the state encompassed by single dotted lines.

When the operation knob 21 is rotated in the forward direction which is the X-direction indicated by arrow shown in FIG. 6 in this state, display of the display section 3 is scrolled in the up direction by one line. Thus, classification items displayed by three lines are switched in the ascending order. Moreover, when the operation knob 21 is rotated in the reverse direction which is the Y-direction indicated by the arrow shown in FIG. 7, display of the display section 3 is scrolled in the down direction by one line. Thus, classification items displayed by three lines are switched in descending order. In either case, one line of the central portion of three lines is flashing-displayed For example, in the case where the function "adjustment of key operation sound volume" of the function No. "F23" is executed, when the operation knob 21 is once rotated in the reverse direction of the Y-direction indicated by the arrow shown in FIG. 7 from the state of display picture shown in FIG. 9A, display is scrolled in the down direction by one line. Thus, the line of "F2tone" is displayed at the central portion. When "3" key of dial key 2 is pushed down (depressed) in this state, the function number "F23" is inputted. Thus, a setting picture of key operation sound volume as shown in FIG. 7A is displayed on the display section 3.

Figure 9B:
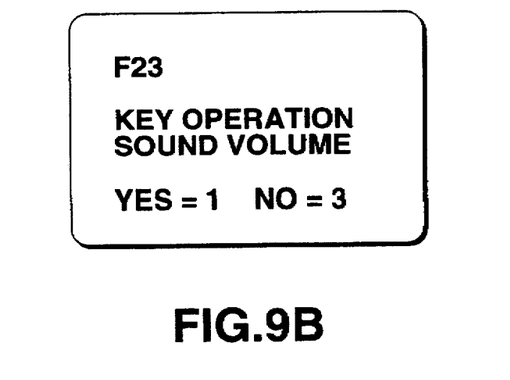
FIG. 9B is a front view showing another example of display state of the display section.

It is to be noted that even if the "2" key of dial key 2 is depressed after the function key 5F is depressed thereafter to depress the "3" key, the function No. "F23" is selected. Thus, a setting picture of key operation sound volume as shown in FIG. 9B is displayed on the display section 3.

Subsequently, when the "1" key of the dial key 2 is depressed in accordance with display of the setting picture shown in FIG. 9B thereafter to rotate the operation knob 21 in the forward direction which is the X-direction indicated by the arrow in FIG. 6 or in the reverse direction which is the Y-direction indicated by the arrow in FIG. 7, key operation sound volume is changed by one step in the up direction or in the down direction. Further, when determination key of function control keys 15 is operated, adjustment of the key operation sound volume is completed.

Moreover, also in the case where retrieval of registered telephone numbers is made, when the operation knob 21 is rotated in the forward direction which is the X-direction indicated by the arrow in FIG. 6 or in the reverse direction which is the Y-direction indicated by the arrow in FIG. 7 similarly to the above-described case, names and telephone numbers of persons at the other ends of the lines are displayed on the display section 3 in the state where they are switched in succession in the up direction or in the down direction.

As described above, since the portable telephone equipment of this embodiment is of a structure to rotationally operate the single operation knob 21 in the forward direction or in the reverse direction to thereby switch the select switch 24 of the rotary type to control parameters of predetermined adjustment function or retrieval function in the up direction or in the down direction, the operation direction of the operation knob 21 and the change direction of parameter of the corresponding function are sensorily matched. As a result, smooth function control can be carried out. Thus, erroneous operation is prevented.

Moreover, since switching between functions controlled by the operation knob 21 is carried out by operating the function key 5F, the number of operation keys can be reduced as a whole, thus making it possible to cope with miniaturization of the equipment.

Figure 10:
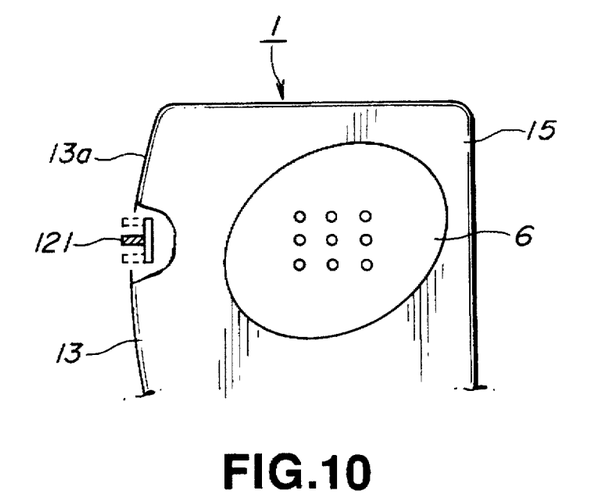
FIG. 10 is a front view showing another example of the operation mechanism.
Figure 11:
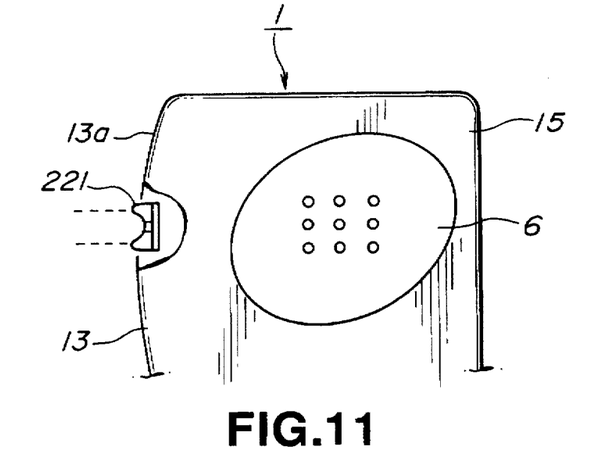
FIG. 11 is a front view showing a further example of the operation mechanism.

While, in the above-described embodiment, there is employed such a configuration to rotationally operate the operation knob 21 to switch the rotary type select switch 24, there may be employed a slide type select switch 24 adapted for sliding an operation knob 121 in upper and lower directions extending over the length direction of the cabinet 1 to carry out switching thereof as shown in FIG. 10, and a seesaw type select switch 24 adapted for depressing the upper side or the lower side of an operation knob 221 to carry out switching thereof as shown in FIG. 11. Also in these cases, the central position of three switching positions of the select switch 24 is caused to be neutral position, and operation knob 121, 221 are biased by spring so that they are automatically returned to the neutral position.

Further, in the case where the rotary type switch or the slide type switch is used as the select switch, the number of contacts is increased, thereby making it possible to vary control speed in dependency upon quantity of displacement of the operation knob. Furthermore, the operation knob or the select switch may be provided at the central portion of the front surface 15 of the cabinet 1.

In addition, while explanation has been given in the above-described embodiment by taking the example of the telephone equipment provided with both the transmitting section and the receiving section and further provided with input keys such as dial key, etc., this invention can be applied as it is to communication terminal equipments provided with only one of the transmitting section and the receiving section.

Industrial Applicability

A portable telephone equipment or a communication terminal equipment according to this invention is provided with a single operation member which can carry out movement operation in the forward direction and in the reverse direction, which carries out input to communicating and/or receiving means and/or switching thereof included within the body, thus to allow only the single operation member to undergo movement operation in the forward/reverse direction, thus making it possible to carry out input to the communicating and/or receiving means and/or switching thereof. This can contribute to miniaturization of the equipment.

In addition, since the single operation member is automatically returned to the neutral position, it is possible to reliably carry out only a desired operation in dependency upon the operation direction of the operation member.

What is claimed is:

1. A communication terminal equipment comprising:
    a rigid body formed into a substantially parallelepiped shape and accommodating communicating means and receiving means therein, the rigid body having a projected portion bulging outwardly from a substantially linear portion of a side surface of the rigid body, the linear portion and the projected portion being contiguous with each other; and
    operation means provided at the projected portion of the rigid body for carrying out one of input operations to the communicating means and the receiving means and switching operations of the communicating means and the receiving means, the operation means including a single operation member movable in a forward direction and in a reverse direction, and biasing means for biasing the switching member to a normally neutral position such that when the switching member is returned to the neutral position by the biasing means the rotational operation member is returned to a neutral position.

2. A communication terminal equipment as set forth in claim 1, wherein the projected portion has a periphery with a circular arc form bulging outwardly from the side surface of the body.

3. A communication terminal equipment as set forth in claim 1, wherein
    the single operation member comprises a rotational operation member rotatably provided with respect to the body, and
    the operation means further includes switch means controlled by the rotational operation member.

4. A communication terminal equipment as set forth in claim 3, wherein
    the projected portion has a periphery with a circular arc form bulging outwardly from the side surface of the body, and
    the rotational operation member is disposed on the projected portion of the body proximate a boundary portion contiguous with the linear portion, the rotational operation member being located at a distal point relative to the side surface of the rigid body.

5. A communication terminal equipment comprising:
    a rigid body formed into a substantially parallelepiped shape and accommodating communicating means and receiving means therein, the rigid body having a projected portion bulging outwardly from a substantially linear portion of a side surface of the rigid body, the linear portion and the projected portion being contiguous with each other; and
    operation means provided at the projected portion of the rigid body for carrying out one of input operations to the communicating means and the receiving means and switching operations of the communicating means and the receiving means, the operation means including a single operation member movable in a forward direction and in a reverse direction and having a rotational operation member rotatably provided with respect to the body and switch means controlled by the rotational operation member, wherein the switch means includes
    a switching member rotatably attached to the body such that rotating the rotational operation member actuates the switch means, and biasing means for biasing the switching member to normally neutral position such that when the switching member is return to the neutral position by the biasing means the rotational operation member is returned to a neutral position.

6. A communication terminal equipment as set forth in claim 2, wherein the single operation member is comprised of a rotatable movement operation member provided on the side surface of the body, and the operation means further includes switch means operated by movement of the movement operation member.

7. A portable telephone equipment comprising:

communicating and receiving means;

display means for displaying information based on a transmitting operation and a receiving operation by the communicating and receiving means;

a plurality of input keys for carrying out an input operation to go the communicating and receiving means;

a rigid body having a substantially parallelepiped shape and accomodating the communicating and receiving means therein, wherein the display means and the plurality of keys are disposed on a front surface of the rigid body, and having on a side surface of the rigid body a projected portion that protrudes outwardly from the side surface of the rigid body; and operation means provided at the projected portion the rigid body for carrying out input operations to the communication means and receiving means and for carrying out switching operations of the communicating and receiving means, the operation means provided with a single operating member movable in a forward direction and in a reverse direction, and the operation means further includes biasing means for biasing the switching member to a normally neutral position such that when the switching member is returned to the neutral position by the biasing means the rotational operation member is returned to a neutral position.

8. A portable telephone equipment as set forth in claim 7, wherein the projected portion has a periphery with a circular arc form, and the projected portion protrudes outwardly from the side surface of the rigid body.

9. A portable telephone equipment as set forth in claim 8, wherein the single operation member is comprised of a rotational operation member rotatably provided with respect to the rigid body, and the operation means further includes switch means actuated by the rotational operation member.

10. A portable telephone equipment as set forth in claim 9, wherein the rotational operation member is disposed at a position on the rigid body such that an outer circumferential portion of the rotational operation member is substantially in correspondence with the periphery of the projected portion having the circular arc form.

11. A portable telephone equipment comprising:

communicating and receiving means;

display means for displaying information based on a transmitting operation and a receiving operation by the communicating and receiving means;

a plurality of input keys for carrying out an input operation to the communicating and receiving means;

a rigid body having a substantially parallelepiped shape and accommodating the communicating and receiving means therein, wherein the display means and the plurality of keys are disposed on a front surface of the rigid body, and having on a side surface of the rigid body a projected portion that protrudes outwardly from the side surface of the rigid body, the projected portion having a circular arc form; and operation means provided at the projected portion of the rigid body for carrying out input operations to the communication and receiving means and for carrying out switching operations of the communicating and receiving means, the operation means provided with a single operating member movable in a forward direction and in a reverse direction and including a rotational operation member rotatably provided with respect to the rigid body and switch means actuated by the rotational operation member, wherein the switch means comprises a switching member rotatably attached to the rigid body and controlled by the rotational operation member such that rotating the rotational operation member actuates the switching member, and the operation means further includes biasing means for biasing the switching member to a normally neutral position such that when the switching member is returned to the neutral position by the biasing means the rotational operation member is returned to a neutral position.

12. A portable telephone equipment as set forth in claim 8, wherein the single operating member is comprised of a movement operation member movably provided with respect to the rigid body along the side surface of the rigid body, and the operation means includes switch means operated by movement of the movement operation member.

* * * * *